Aug. 12, 1941.   H. SCHMIDT   2,252,387
REFRIGERATION THERMOMETER
Filed Jan. 27, 1939
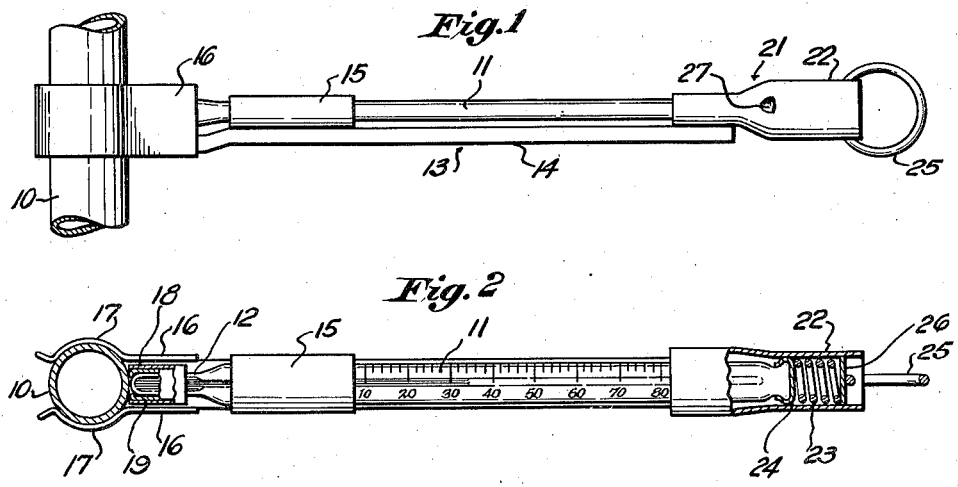
INVENTOR
*Harry Schmidt*
BY *Albert R Henry*
ATTORNEY Patented Aug. 12, 1941

2,252,387

UNITED STATES PATENT OFFICE 2,252,387

REFRIGERATION THERMOMETER

Harry Schmidt, Buffalo, N. Y., assignor to Fedders Manufacturing Company, Inc., Buffalo, N. Y.

Application January 27, 1939, Serial No. 253,156

4 Claims. (Cl. 73—339)

This invention relates to thermometers, and it has particular reference to a mercury-in-glass thermometer disposed in a mounting member to adapt it for quick and accurate temperature measurements on heat exchange surfaces, such as those employed in refrigeration.

In the heat exchange arts, it is quite customary to provide a coil of pipe containing a heating or cooling medium, and to force a current of air over the surfaces of the piping and fins attached thereto, thereby either cooling or heating the air. Thus, in air conditioning work, the air to be treated may be moved through a duct and over the face of a refrigeration expansion coil consisting of a number of finned tubes constituting parallel circuits for the refrigerant. One problem which has arisen with expansion coils of this nature has been the balancing of one circuit with another, which problem involves, in its solution, the measurement of temperatures at various parts of the coil.

Heretofore, insofar as I am aware, temperature measurements have been made by means of thermocouples or mechanical thermometers which are not only initially expensive, but which also must be specially secured to the piping. In practice, these devices do not lend themselves to quick measurement, nor can the average service man or installation engineer afford sufficient instruments to take a series of readings over the entire coil in a limited period of time. The ordinary mercury-in-glass thermometer, however, while inexpensive, is inherently unsuited to measurements of the type indicated, due to the very limited contact surface obtainable with the coil, and the practical inability of the test engineer to hold the thermometer in contact with the coil.

According to the present invention, means are provided to adapt the mercury-in-glass type of thermometer to temperature measurements over a coil surface, which means, essentially, comprise a holder for the thermometer provided with a clamping device for resiliently engaging an extensive portion of the heat exchange surface. With such a thermometer, temperatures at any point of the coil may be quickly and accurately measured, and the service man is provided with an inexpensive tool for making the necessary determinations.

A typical embodiment of the invention is illustrated in the accompanying drawing, wherein:

Fig. 1 is a side view of a thermometer and holder, particularly adapted for measuring temperatures on cylindrical pipes; and, Fig. 2 is a plan, partially in section, of the device shown in Fig. 1.

Referring to Figs. 1 and 2, the numeral 10 indicates a portion of tubing forming part of a heat exchanger, the surface temperature of which is to be determined. The thermometer, shown as detachably connected to the tubing 10, comprises a mercury-in-glass thermometer 11 having a bulb 12 and a holder or frame 13. The frame comprises a supporting plate 14 formed with a sleeve 15 which encircles the stem of the thermometer 11 and engages it snugly enough to prevent undue lateral movement without preventing some sliding movement.

One end of the plate 14 is formed with a pair of outstanding lugs 16 forming a partial housing for the bulb 12, and projecting beyond the end of the plate 14 in curvilinear fashion, thereby providing resilient tines 17 adapted to engage the surface of the pipe 10. It will be seen that when the tines 17 are thrust against the pipe surface that they will spread and engage thereover, and in effect constitute a resilient clamp securing the entire unit to the pipe.

A cylindrical sleeve 18 is secured to the frame 14 between the lugs 16 to receive a slidable bushing 19 which is disposed around the bulb 12 of the thermometer 11. The internal diameter of the sleeve 18 may be made such that it will receive loosely the bulbs of the thermometers which will customarily be used. The bushing 19, which advantageously may be of silver, because of the high heat conductivity of that metal, may readily be formed bp the user himself from either a piece of tubing or of foil. By this construction, the glass bulb 12 is protected from breakage, and, as shown, is brought into direct and good indirect contact with the pipe 10. All of the parts of the holder adjacent the bulb 12 are, of course, made of metal, and it will be seen that the lugs 16, which partially enclose the bulb 12, protect the bulb from stray air currents and thereby enhance the accuracy of the reading on the thermometer stem.

The opposite end of the frame 14 is provided with a sleeve 21 having a portion 22 adapted to receive a light coiled spring 23 which presses, through a cap 24, against the end of the thermometer stem. The particular thermometer herein illustrated is of a type having a shouldered end, and the cap 24 is therefore turned into the reduced portion of the glass stem, the better to hold it in place. A segmental ring 25, inserted through aligned holes formed in the portion 22, prevents the displacement of the spring 23 which constantly presses against the free ends of the ring through a washer 26. Inasmuch as there is no advantage in having the thermometer bulb 12 project too far beyond the lugs 16, an abutment 27 for the spring 23 is struck into the portion 22, as best shown in Fig. 1.

With the assembly as described, the glass thermometer has a limited sliding movement along the holder 13, and its bulb 12 is brought into contact with the surface of the pipe 10 whenever the clamp 17 is snapped on the pipe surfaces. This direct contact, coupled with the heat transfer obtained through the tines 17, lugs 16, and concentric sleeves 18 and 19, causes the fluid in the thermometer to expand or contract quickly to give an accurate temperature reading. The user may affix the instrument quickly to any portion of the tubing, and leave it in place while positioning or examining other instruments. In practice, it has been found that the thermometer is accurate within one half a degree Fahrenheit, as calibrated against precision thermocouples, and that it is much easier to apply or remove than the more expensive instruments. If perchance the glass thermometer should be broken, it may readily be replaced by removing the ring 25 and inserting a new thermometer.

It will, of course, be apparent that the invention may be devised in other modes than those herein particularly illustrated, and it is therefore intended to encompass all such modifications and variations as fall within the purview of the following claims.

I claim:

1. A thermometer holder for a mercury-in-glass thermometer comprising a plate member adapted to underlie the stem of the thermometer, a bulb-receiving sleeve positioned on the plate member adjacent one end thereof, a second sleeve positioned adjacent the opposite end of the plate member and adapted to house the opposite end of the thermometer, said last named sleeve being provided with means for resiliently urging the bulb into said first named sleeve, a pair of upstanding lugs on the plate member adapted to shield the sides of said bulb-receiving sleeve from stray air currents, said lugs extending beyond the end of the plate member and being formed into resilient tines adapted to engage a tubular surface of a heat exchanger.

2. A thermometer assembly for measuring surface temperatures on heat exchangers, comprising an elongated mercury-in-glass thermometer having a bulb at one extremity, a mounting member including a tubular portion, a pipe-engaging clamp disposed at one end of the mounting member, said thermometer being slidably mounted in the tubular portion with the bulb being directed toward said clamp, and a spring carried by the tubular portion and engaging and urging the thermometer toward said clamp for intimate contact of the bulb with the pipe to which the clamp may be attached.

3. A thermometer assembly for measuring surface temperatures on heat exchangers, comprising an elongated mercury in glass thermometer having a bulb at one extremity, a mounting member including a tubular portion, a pair of resilient clamp members secured to the mounting member in spaced relation relative to the axis of the tubular member, said clamp members projecting beyond the end of the mounting member and being formed to provide pipe engaging tines, said thermometer being slidably mounted in said tubular portion with its bulb extending between said clamp members, and a spring carried by said tubular portion and engaging and urging the thermometer toward said clamp members and into contact with the pipe to which the clamp members may be attached.

4. A thermometer assembly for measuring surface temperatures on heat exchangers, comprising an elongated mercury in glass thermometer having a bulb at one extremity, a mounting member including a tubular portion disposed at one end thereof for slidably receiving the bulb of the thermometer, and a second tubular portion for slidably receiving the opposite end of the thermometer, a pipe engaging clamp disposed at the end of the mounting member adjacent said first tubular portion, said second tubular portion containing a spring adapted to press against the adjoining end of the thermometer to urge the bulb end of the thermometer into contact with a pipe which may be engaged by said clamp, and a split supporting ring connected to the extremity of said second tubular portion and providing an abutment for said spring.

HARRY SCHMIDT.